United States Patent [19]

Suchanek

[11] Patent Number: 4,753,726

[45] Date of Patent: Jun. 28, 1988

[54] DISTRIBUTOR FOR FILTERS

[75] Inventor: Steven C. Suchanek, Sun Prairie, Wis.

[73] Assignee: Essef Corporation, Mentor, Ohio

[21] Appl. No.: 23,213

[22] Filed: Mar. 9, 1987

[51] Int. Cl.$^4$ .................. B01D 23/10; B01D 23/24
[52] U.S. Cl. .................. 210/232; 210/279; 210/289; 210/291
[58] Field of Search ............... 210/232, 275, 279, 288, 210/289, 291, 345

[56] References Cited

U.S. PATENT DOCUMENTS

| | | | |
|---|---|---|---|
| 425,573 | 4/1890 | Jewell et al. | 210/279 |
| 949,455 | 2/1910 | Usher | 210/279 |
| 2,627,503 | 2/1953 | Anderson | 210/289 |
| 3,747,768 | 7/1973 | Barrera | 210/288 |
| 4,094,790 | 6/1978 | Schmidt, Jr. | 210/289 |
| 4,169,793 | 10/1979 | Lockshaw | 210/169 |
| 4,200,536 | 4/1980 | Kaufman | 210/279 |
| 4,379,750 | 4/1983 | Tiggelbeck | 210/232 |
| 4,478,716 | 10/1984 | Hasegawa et al. | 210/289 |

Primary Examiner—Richard V. Fisher
Assistant Examiner—Linda S. Evans

Attorney, Agent, or Firm—Pearne, Gordon, McCoy & Granger

[57] ABSTRACT

A filter distributor is disclosed which includes a plurality of radially-extending conduits or laterals pivotally mounted at their inner ends on a hub and extending to outer ends substantially adjacent to the outer wall of the filtered tank. Each lateral is provided with an inner strainer and an outer strainer. The outer strainers are sized to service an adjacent zone along the outer portions of the tank and the inner strainers are sized to service adjacent inner zones. In the illustrated embodiment, the outer strainers have an open flow area twice as great as the inner strainers and service the outer two thirds of the tank. The strainers are positioned substantially at the centroid of the adjacent zones which they service. The sizing of the strainers and their location is arranged so that substantially uniform flow occurs through all of the filter medium during normal filtering operation and backflow operations. Consequently, the entire filter medium remains active and the core effect found in many prior art systems is avoided. The pivotal mounting of laterals permits movement of the laterals to a compact position in which they can be inserted into and removed from the tank through a relatively small opening.

8 Claims, 3 Drawing Sheets

DISTRIBUTOR FOR FILTERS

BACKGROUND OF THE INVENTION

This invention relates generally to fluid filters and more particularly to a novel and improved distributor system for filters.

PRIOR ART

Fluid filters are often provided with distributor systems which collect the fluid passing through the filter medium and through which fluid passes to the outlet of the filter. Such distributor systems also operate during back-flushing to distribute the back-flushing fluid to wash away sludge or foreign matter collected in the filtering medium during the operation of the filter. Such distributors are also used in ion exchange filtering systems such as water softeners and the like. During such back-flushing operations, the back-flushing fluid also functions to regenerate the filter medium. Examples of prior art filter and distributing systems are illustrated and described in Letters U.S. Pat. Nos. 3,747,768, 4,094,790, 4,169,793, 4,200,536, 4,379,750 and 4,478,716.

Typically, filter tanks are generally cylindrical and are provided with inlet and outlet openings located along the center axis of the tanks at the top and bottom thereof respectively. Distributors for such cylindrical cylinders are often assembled or installed through one or the other of the central openings in the tank. Examples of such filters and distributor systems are illustrated in some of the U.S. Letters Patents listed above such as the U.S. Pat. Nos. 3,747,768, 4,169,793 and 4,478,716. In order to permit installation of the distributor through the relatively small central openings in the tank, such distributors usually utilize a plurality of radially-extending distributor tubes or laterals which extend radially from a central hub to a location substantially adjacent to the periphery of the tank. Such laterals or distributor tubes are provided with various types of openings or strainers which communicate through the wall of the lateral to permit filtered fluid to enter the lateral and be conducted to the filter outlet during normal filtering operation and which permit reversed flow from the laterals into the filter medium during back-flushing operations.

In the first of the above-listed patents, such laterals are connected to the central hub by a swivel-type connection so that the laterals can be positioned in a compact aligned condition for insertion through the opening in the tank and then pivoted down to an operative position in which they extend substantially radially from the hub to locations adjacent to the periphery of the tank. In the other instances, the hub is inserted into the tank through the central opening and the individual laterals are assembled on the hub, for example, by a threaded connection while the laterals and the hub are located within the tank. This is a difficult operation which requires the operator to work through a relatively small opening in the tank during the assembly of the distributor. Further, if disassembly is required for any reason, the disassembly operation which must be performed through a relatively small opening is very difficult.

Typical distributors utilizing radially-extending laterals have not in the past provided a uniform distribution of fluid flow through the filter medium. Because the laterals extend radially, they are spaced substantially further apart adjacent to the periphery of the tank then they are adjacent to the hub. Consequently, the typical strainers or openings provided on the laterals have an open area which is concentrated in the center of the tank. Therefore, the fluid flow which follows the path of the least resistance has been highly concentrated along the center of the filter medium. Similarly, during back-flushing operations, most of the back-flushing fluid flowed through the center portion of the filter medium and efficient back-flushing has not occurred along the zones spaced from the center of the tank. In time, the filter has a small central core through which most of the fluid flows during both filtering and back-flushing operations. This results in an effective substantial reduction in the size of the filter and eventually renders the outer portions of the filter medium virtually inoperative.

Some of the above-listed Letters Patents attempt to overcome this concentrated core flow problem by utilizing a distributor structure intended to produce an even distribution of fluid flow over substantially the entire cross-section of the filter medium. One such arrangement is illustrated in the U.S. Pat. No. 4,200,536. In such distributor, a plurality of spiral-formed laterals are provided. However, such a distributor system cannot be installed in a filtered tank through a relatively small opening. Therefore, a distributor system of such patent can only be used within a filter tank which is fully open or which can be disassembled to a fully opened condition.

Others of the above-listed Letters Patents such as U.S. Pat. Nos. 4,094,790 and 4,379,750 disclose elaborate distributor conduits which, in some instances, tend to overcome the central core problem described above. Here again, however, such distributors cannot be effectively installed within a tank through a relatively small central opening therein.

SUMMARY OF THE INVENTION

In accordance with the present invention, a novel and improved filter and distributor system is provided which ensures a relatively uniform distribution of fluid flow through the filtering or ion exchange medium both during normal operation and back-flushing operation. As used herein, the terms "filter" and "filtering" are intended to encompass both conventional separating techniques, employing a medium such as sand, and ion exchange techniques as used in water softening. The back-flushing operation maintains the filter medium in a uniform clean condition so that the entire filter medium functions efficiently and the problem of core flow is virtually eliminated.

In accordance with the illustrated embodiment of this invention, a distributor is provided which utilizes a central hub and radially-extending laterals which can be assembled on the hub and then installed through a relatively small central opening in the filter tank. The laterals are provided with strainers sized so that the fluid flow is not concentrated in the central portion or core of the filter medium.

In the illustrated embodiment, each lateral is provided with two spaced strainers. The inner of the strainers is located to service the adjacent central zone of the filter medium and the outer strainer is located to service the outer portions of the filtered medium. The two strainers are sized so that the flow area of each strainer corresponds with the area of the zone of the filtered medium serviced by the strainer.

For example, in the illustrated embodiment, the outer strainers service a zone of filtered medium twice as large as the inner strainers and the outer strainer has an open area twice as big as the inner strainers. It should be understood however, that the illustrated embodiment is by way of an example of one preferred embodiment of this invention and that within the broader aspects of this invention, laterals can be provided with more than two strainers appropriately sized and located to ensure uniform flow through the filter medium both during normal filtering operation and during back-flushing operations.

In accordance with another aspect of this invention, the laterals are mounted on a central hub with a pivotal connection which allows the laterals to be moved to an adjacent aligned, compact position so that an assembled distributor system can be inserted through a relatively small opening in the filter tank and then caused to pivot down to an operative position in which they extend radially from the central hub to locations adjacent to the periphery of the tank. The shape of the laterals and the structure of the pivots are arranged so that a compact cluster or assembly of aligned laterals is provided for installation or removal of the distributor and so that when the laterals pivot down to their extended or operative position, they are accurately located within the tank for uniform distribution of the fluid flowing through the filter.

These and other aspects of this invention are illustrated in the accompanying drawings and are more fully described in the following specification.

BRIEF DESCRIPTION OF THE DRAWINGS

FIG. 3 is an enlarged fragmentary section illustrating the structural detail of the mounting of the distributor within a filter tank;

DETAILED DESCRIPTION OF THE DRAWINGS

Figure 1:
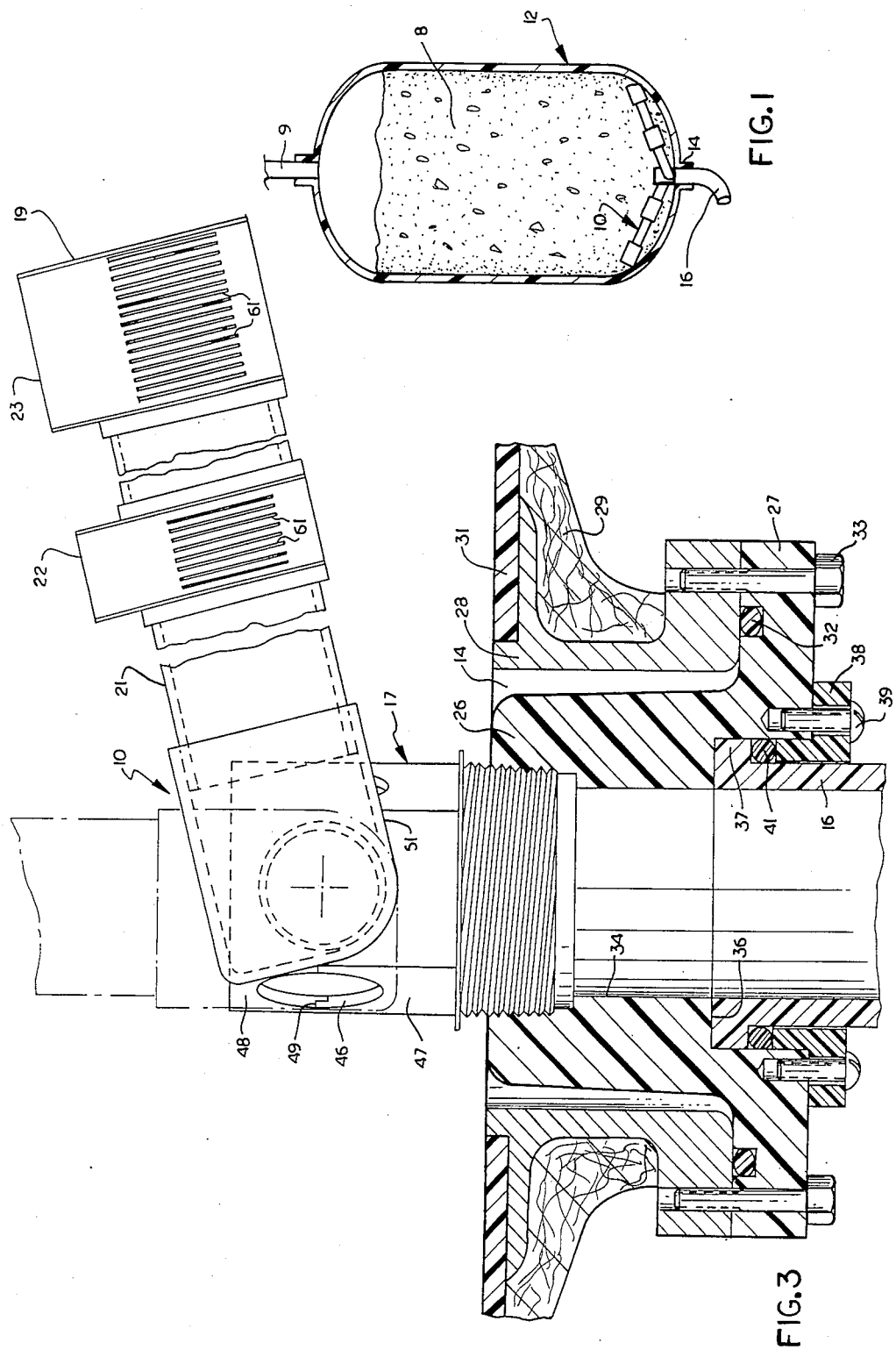
FIG. 1 is a schematic vertical cross section of a filter incorporating this invention.

In the illustrated embodiment of this invention a distributor 10 is installed within a cylindrical filter tank 12. The tank 12 provides an upper inlet opening 9 and a lower discharge opening 14. A filter medium 8 such as sand and gravel is located in the tank around and above the distributor.

Figure 2:
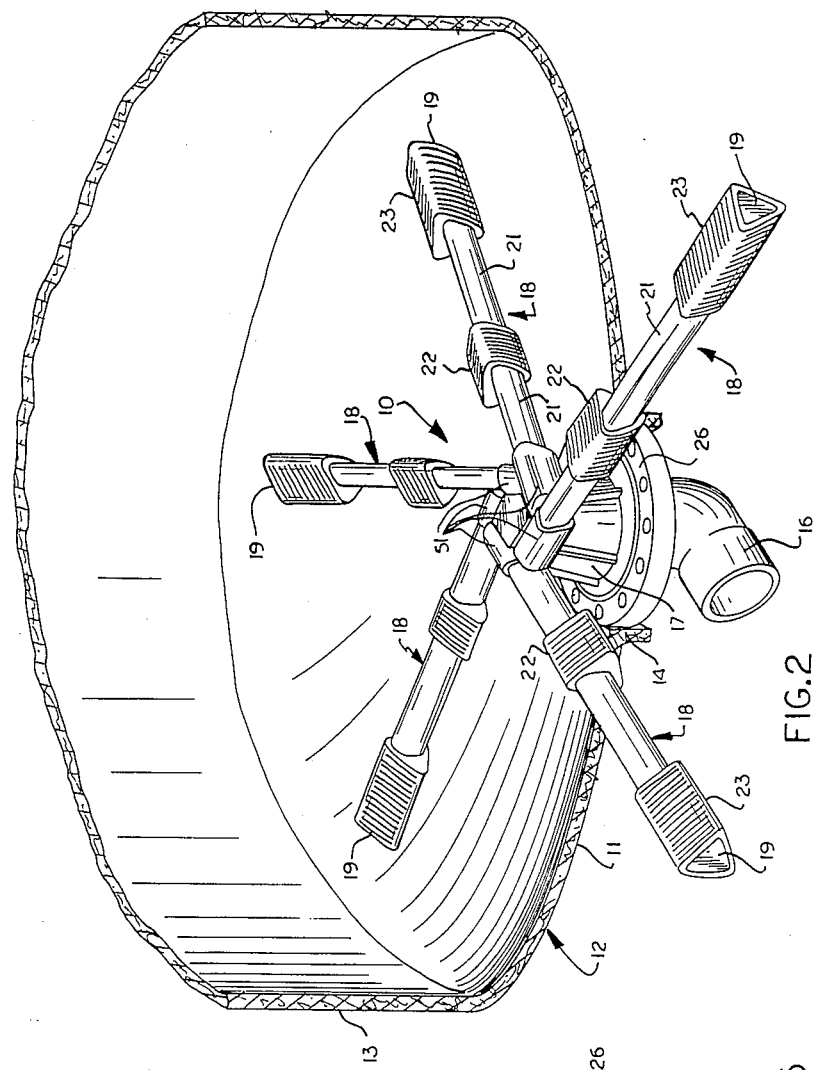
FIG. 2 is a perspective view illustrating the distributor in its extended operative position within a filter tank which has been partially cut away for purposes of illustration.

FIG. 2 illustrates a preferred embodiment of a distributor 10 in accordance with this invention installed in the lower end 11 of a cylindrical filter tank 12. Such tank in FIG. 2 is cut away for purposes of illustration. However, the tank has cylindrical side walls 13 and the lower generally concaved end wall 11 provided with the central opening 14. In normal filtering operation, fluid such as water enters the tank through the upper opening 9 and flows down through the filter medium 8. After the fluid passes through the filter medium 8, it is collected by the distributor 10 and is exhausted from the filter through an outlet fitting 16. It should be understood that as used therein, the term "filter medium" may be of any type and includes ionic exchange type materials. Further, although the fluid being filtered is normally a liquid, the term "fluid" is intended to encompass a gas as well as liquids.

The distributor includes a central hub 17 and a plurality of radially-extending conduits or laterals 18 which are connected at their inner ends to the hub 17 by a pivot structure described in detail below. The laterals 18 extend substantially radially to outer ends 19 relatively close to the cylindrical side wall 13. The location of the outer end of the laterals is discussed in detail below. In the illustrated embodiment, there are five laterals pivotally connected to the hub 17. Each lateral includes conduit portions 21 and a pair of strainers 22 and 23 with the inner strainer spaced a relatively small distance from the hub and the outer strainer 23 located at the outer end of the associated lateral 18.

Referring now to FIG. 3, the hub 17 of the distributor is threaded into a mounting ring 26 having a flange 27 which is bolted to a collar 28 molded into the end of the tank around the central opening 14. The illustrated tank 12 is formed of fiber reinforced resin 29 normally referred to as fiberglass and is provided with a plastic liner 31. It should be understood, however, that the particular tank structure illustrated is only by way of example and that this invention is applicable to filters having tanks formed of substantially any material. An O-ring type seal 32 positioned in a groove within the flange 27 provides a fluid-type joint between the mounting ring 26 and the collar 28 when the mounting ring is secured by bolts 33 to the collar 28.

The mounting ring 26 is provided with a central passage 34 threaded at its inner end to receive the hub 17 and provided with a radial shoulder 36 spaced from its outer end. The outlet fitting 16, which in the illustrated embodiment is an elbow, is provided with a radial flange 37 and provides a swivel connection with the mounting ring 26 so that the outlet fitting 16 can be swiveled for alignment with the discharge piping without moving the tank. A gland ring 38 mounted on the flange 27 around the outlet fitting 16 by screws 39 and an O-ring seal 41 provide a fluid-type joint between the mounting ring and the outlet fitting.

The hub 17 in the illustrated embodiment is formed with five sides each provided with an opening 46 for mounting one of the laterals with a pivot-type connection. The hub itself is formed of a lower hub element 47 and an upper hub element 48 which are joined at 49 along the center line of the openings 46.

Figure 4:
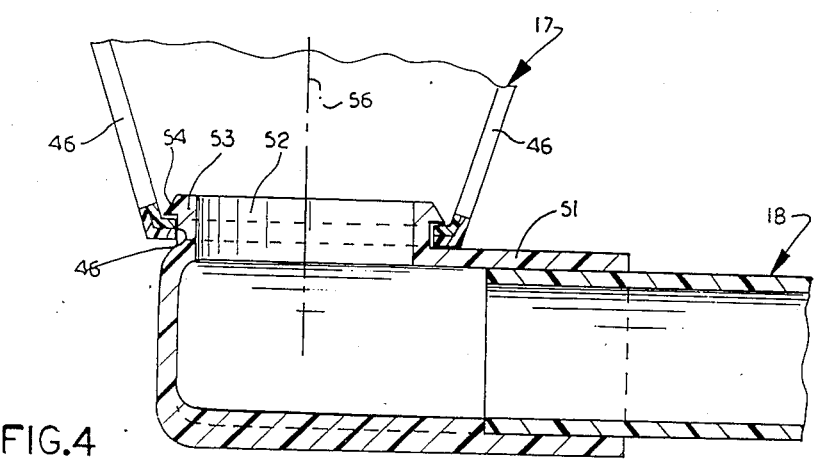
FIG. 4 is a fragmentary section illustrating the pivotal mounting of the laterals on the distributor hub.

Referring to FIG. 4, each of the laterals 18 is provided with a boot at its inner end 51. The boot 51 is provided with a lateral opening 52 surrounded by a lateral mounting projection 53 which extends through the associated opening 46 in the hub. Interiorly of the hub, the projection 53 is provided with a short flange 54 to retain the boot 51 in its mounted position illustrated in FIG. 4. There are five boots 51 and laterals 18 connected at their inner ends to the hub 17 with one boot connected at each of the openings 46. The connection between the hub and the boot permits each hub to rotate around a lateral horizontal axis 56 extending radially from the center of the hub 17.

Each of the strainers 22 and 23 are formed with a plurality of slot-like openings 61 through which fluid can flow between the interior passage of the laterals and the filter medium 8 surrounding the laterals. During normal filtering operation, the fluid passing down through the filter medium 8 enters the laterals through the slot openings 61 and flows along the conduit portions 21 to the hub and from the hub to the outlet fitting 16.

Figure 5:
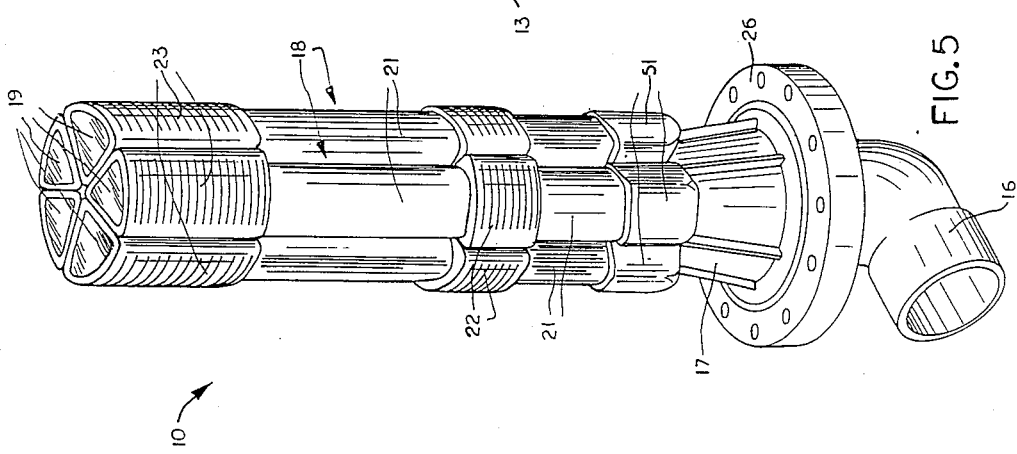
FIG. 5 is a perspective view of a distributor in accordance with this invention illustrating the laterals in their folded, compact position in which the distributor is installed within and removed from a filtered tank.

Prior to installation of the distributor 10, the entire distributor is assembled on the mounting ring 26 and the laterals are pivoted up into an installation position illustrated in FIG. 5. In such position, a compact grouping of the laterals is provided having a generally circular shape sized to fit through the collar 28. The strainers are preferably formed with a generally triangular cross-section so that they nest in the installation position of FIG. 5 to form a compact circular group. With such a structure, the maximum strainer cross-section can be provided while still permitting the strainers to nest with each other in a compact grouping.

The assembled and compact distributor is inserted as a unit up through the collar 28 and the mounting ring is bolted to the collar to complete the assembly. Once inside the tank, the laterals pivot down to the extended position illustrated in FIG. 2 in which the outer ends of the outer strainers 23 rest on the end wall 11 of the tank. Because the pivots which connect the laterals to the hub allow pivotal movement only about pivot axis, the laterals assume a radiating position in which the strainers are symmetrically positioned around the end wall and are equally spaced from the adjacent strainers. After the distributor is installed, the filter medium is inserted through the upper opening in the tank and completely surrounds the laterals 18.

Figure 6:
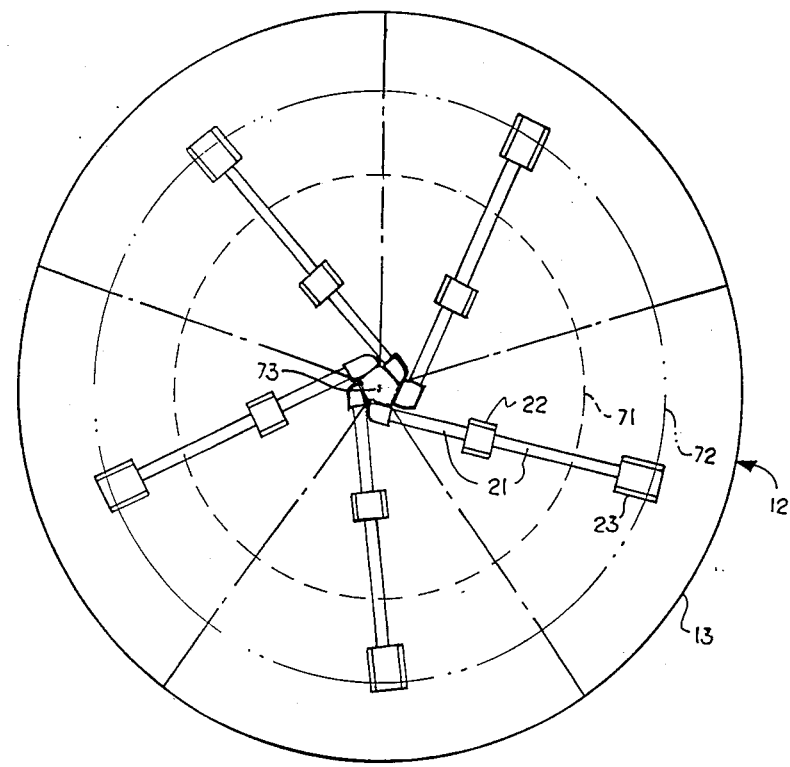
FIG. 6 is a schematic plan view illustrating the distributor in its operative position within a filter tank and also illustrating the location and size of the strainers and their position within the zones serviced by the respective strainers.

FIG. 6 illustrates the positioning and size of the strainers so as to ensure a substantially uniform flow of fluid occurs through the filter medium both during the normal filtering operation and the back-flushing operation. In such figure, the tank 12 is divided into zones of equal area. The area within the inner dotted circle 71 is equal to one third of the total area of the tank. Similarly, the zone between the inner dotted circle and 71 and the outer dotted circle 72 is equal to one third of the total area of the tank. Finally, the zone between the outer dotted circle 72 and the cylindrical side wall 13 of the tank is equal to a third of the total area of the tank.

In order to achieve such equal areas, the radius of the inner circle 71 must be equal to 0.577 times the radius of the inner wall of the tank 12. The outer circle 72 has a radius equal to 0.8165 times the radius of the inner wall of the tank. For example, if the inside diameter of the tank is 48 inches, the tank has an area of 1,809 square inches. If the tank is divided into three concentric zones of equal area, each zone contains 603 square inches. In such case, the diameter of the inner circle 71 is 27.74 inches and the diameter of the outer circle 72 is 39.2 inches.

In accordance with this invention, the strainers are sized in position so that the inner strainers 22 each service five equal sized inner zones within the circle 71. These inner zones have a total area equal to one third of the total area of the tank. The outer strainers 23 on the other hand, serve five equal sized outer zones which have a total area equal to the other two thirds of the area of the tank between the inner side of the wall 13 and the inner circle 71.

In order to ensure that a substantially equal distribution of flow exists through the filtering medium both during normal filtering operation and back-flow flushing operation, the outer strainers 23 are provided with a total slot area twice as big as the total slot area of the inner strainers 22. Further, the inner strainers are preferably symmetrically positioned around the center axis 73 of the tank and are located substantially at the centrode of the zone served by each inner strainer 23. Because there are five radials and therefore five inner strainers 23, each inner strainer 23 services a generally pie-shaped zone having an area equal to one fifth of the area within the circle 71. Similarly, the five outer strainers are located substantially at the centrode of the zone which they serve and each zone is equal to substantially one fifth of the area between the outer wall of the tank and the line 71.

Since the total area of the openings in each strainer are sized to provide a ratio of the areas substantially equal to the ratio of areas to be serviced by the particular strainer and since the strainers are each located substantially at the center of the area of service for the strainer, a substantially uniform flow occurs and the core effect present in many prior art devices is avoided. When back-flushing occurs, sufficient fluid is delivered to the peripheral portions of the tank to ensure that all of the filter medium 8 is adequately washed and the tendency for the peripheral portions of the tank to become ineffective is eliminated.

Preferably, the sizing of the strainers and the lateral conduit are selected so that significant pressure drops do not occur as the fluid flows through the distributor. For example, if the outlet fitting 16 has a three-inch internal diameter, it provides a cross-sectional area of about 6.2 inches. The open area of the lateral conduits and hub is preferably at least one and a half times as great as the area of the fitting. Therefore, the hub and the five laterals have a total area of about 9.4 square inches. Further, the open area of the inner and outer strainers 22 and 23 is provided with an open area through the slots equal to about one and a half times the open area of the conduit portion of the lateral. Since the total lateral open area within the conduit portion should be about 9.4 square inches, in the example being presented, each lateral has an open area of about 1.88 square inches. The open area for the associated strainers is one and a half times as much or about 2.82 square inches. Since the illustrated embodiment provides inner strainers 22 which service a zone equal to one half of the area of the service zone for the outer strainers 23, the open area of the inner strainer is about 0.94 inches and the open area of the outer strainers 23 is about 1.88 square inches.

It should be understood that even though the illustrated embodiment provides only two strainers at spaced locations along each lateral and the strainers are sized and located to service zones having an area ratio of two to one, the present invention can be incorporated and other arrangements in which service areas differ in relationship to each other from the illustrated embodiment and the number of strainers and their locations and size can differ from the illustrated embodiment.

With the present invention, the uniform flow distribution is provided with a distributor which can be easily assembled external of the tank and inserted through a relatively small opening in the tank for installation.

Such distributor can also be removed from a such relatively small opening without difficulty.

Although the preferred embodiment of this invention has been shown and described, it should be understood that various modifications and rearrangements of the parts may be resorted to without departing from the scope of the invention as disclosed and claimed herein.

What is claimed is:

1. A filter comprising a tank defining a chamber, inlet means for supplying fluid to said chamber, outlet means for removing said fluid from the said chamber, and a filter medium located in said chamber operable to filter fluids flowing between said inlet means to said outlet means, said outlet means including a centrally-located hub and a plurality of substantially straight laterals extending from said hub to locations substantially adjacent to the periphery of said chamber, said laterals providing a plurality of strainers at spaced locations along the length of said laterals, each said strainer closest to said hub having a first strainer area, each said strainer further spaced from said hub having a second strainer area substantially greater than said first strainer area, each strainer servicing an adjacent associated zone of said chamber, the ratio of sizes of said strainer areas being substantially equal to the ratio of sizes of said adjacent associated zones.

2. A filter as set forth in claim 1 wherein said tank is substantially cyclindrical, said laterals extending substantially radially from the central axis of said tank, said zones associated with said closest strainers having an area at least substantially as small as one half of the area of said zones associated with said strainers further spaced from said hub.

3. A filter as set forth in claim 2 wherein each strainer is located substantially at the center of its associated adjacent zone.

4. A filter as set forth in claim 3 wherein there are less than six laterals.

5. A filter as set forth in claim 2 wherein a pivot pivotally connects each said lateral to said hub for rotation about a pivot axis substantially perpendicular to said central axis between an extended substantially radial position and a compact position in which said laterals are substantially parallel, said hub and laterals being insertable through said outlet means as an assembly when said laterals are in said compact position.

6. A filter as set forth in claim 5 wherein said strainers are substantially triangular in cross-section and nest in a generally circular group when said laterals are in such compact position.

7. A filter as set forth in claim 6 wherein each lateral provides two strainers, the outermost of said strainers having a strainer area at least about twice the strainer area of the innermost of said strainers.

8. A filter as set forth in claim 1 wherein said outlet means includes an outlet having a first open area, said laterals have a second total open area at least about one and one half times said first open area, and said strainers having a third open area at least about one and one half times said second open area.

* * * * *